Sept. 6, 1932.    H. J. COBURN    1,876,488
TRACTOR WHEEL
Filed Oct. 6, 1930
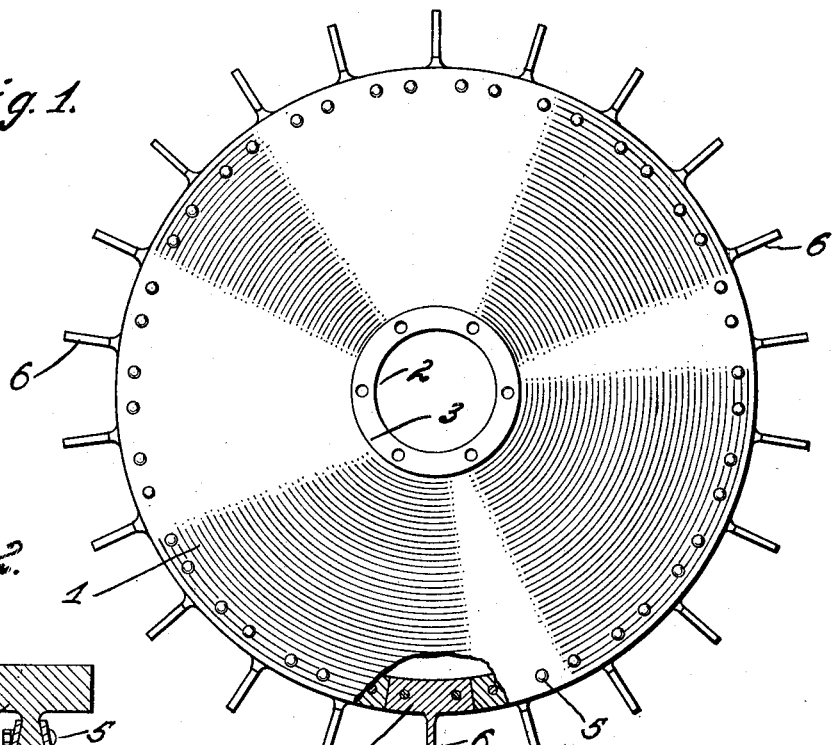
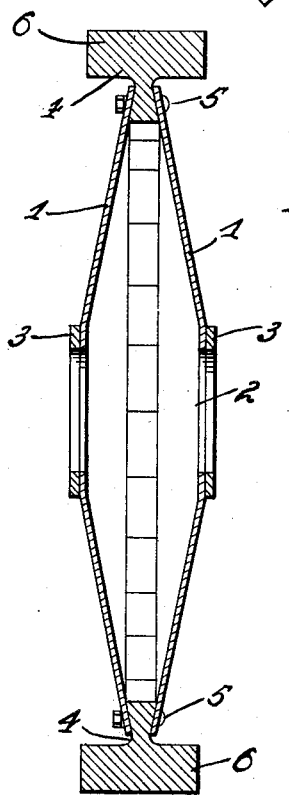
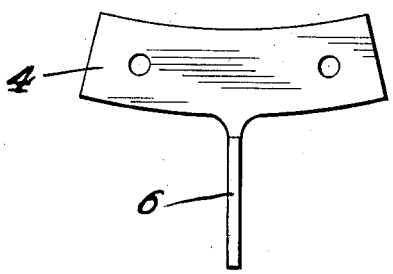
H. J. Coburn.
INVENTOR
BY Victor J. Evans
ATTORNEY
WITNESS: George L. Ogle.

Patented Sept. 6, 1932

1,876,488

UNITED STATES PATENT OFFICE

HENRY J. COBURN, OF BODE, IOWA

TRACTOR WHEEL

Application filed October 6, 1930. Serial No. 486,849.

My present invention has reference to a wheel construction that is primarily designed for use in connection with tractors or like vehicles and which may be removably or permanently connected with such vehicles, the primary object of the invention being the provision of a wheel that is peripherally formed with lugs or blades that dig into the ground over which the vehicle travels and thereby spades the soil so as to loosen the same and to render the soil in a condition for planting or for the easy passage of a plow or cultivator through such soil.

A further and important object is the provision of a wheel for this purpose whose sides are in the nature of disc members and whose rim is made up of a plurality of blocks that have their sides inclined in opposite directions, the said blocks having their ends contacting and being bolted to the discs and each of the blocks having centrally formed on its outer face a laterally extending lug or blade of a desired width, length and thickness and further wherein the spindle openings in the disc sides are reinforced by suitable rings which are bolted or welded thereto.

To the attainment of the foregoing the invention consists in the wheel hereinafter described and definitely claimed.

In the drawing:

Figure 1 is a side elevation of the wheel with parts broken away and parts in section.

Figure 2 is an approximately central transverse sectional view thereof.

Figure 3 is a face view of one of the blade-carrying blocks.

Figure 4 is a side elevation thereof.

As disclosed by the drawing the sides of the improvement are in the nature of metal discs 1. The discs, from their outer peripheries are flared to the center thereof, the said central portions being straight and provided with round openings 2. Arranged around each of these openings there is a metal ring 3 secured to the sides 1 in any desired or preferred manner.

The rim of the wheel is made up of metal segmental blocks 4. The blocks have their sides inclined or beveled and their ends cut angularly so that the said blocks may be brought into contacting engagement. When the blocks are arranged between the discs or sides 1 of the wheel to form a complete rim bolts or rivets 5 are passed through the sides 1 and the said blocks.

Each of the blocks is centrally formed with a transversely arranged lateral extension in the nature of a lug or blade 6. The lugs or blades are of a desired length, width and thickness, the length and width of the blades being sufficient to dig into the soil to properly spade the same, when the wheel is rotated on the vehicle to which it is attached. The lugs or blades 6 are in close proximity to each other so that the soil will be effectively dug into or spaded when the wheel passes thereover.

The wheel may be in the nature of a removable member to supplant the wheels of an ordinary tractor or like vehicle or may remain a permanent part of such vehicle. While the improvement is primarily designed for spading soil, it is obvious that the same can be employed as a traction means for vehicles passing over soft or sandy earth. In the showing of the drawing the lugs or blades 6 are arranged at a right angle with respect to the blocks 4 which is preferable in spading operation but obviously the lugs or blades may be arranged at an acute angle to the blocks 4 if desired.

It is thought the construction and advantages of the invention will be fully apparent to those skilled in the art to which such invention relates so that further detailed description will not be required.

Having described the invention, I claim:

A wheel comprising discs having openings at their centers, rings applied to the discs and surrounding said openings, said discs having converging peripheral portions, blocks transposed between the peripheral edges of the discs and having converging side surfaces fitting snugly against the inner surfaces of the discs, said blocks contacting each other at their ends throughout the periphery of the wheel, each block having a blade disposed radially with relation to the wheel and extending transversely across the periphery of the disc.

In testimony whereof I affix my signature.

HENRY J. COBURN.